US012718599B2

(12) United States Patent
Szczypka et al.

(10) Patent No.: US 12,718,599 B2
(45) Date of Patent: Aug. 25, 2026

(54) TEXT DETECTION AND EXTRACTION FOR SHARED SCREEN PRESENTATIONS

(71) Applicant: Grammarly, Inc., San Francisco, CA (US)

(72) Inventors: Marcin Szczypka, Gdańsk (PL); Mateusz Osojca, Szczecin (PL)

(73) Assignee: Superhuman Platform Inc.

( * ) Notice: Subject to any disclaimer, the term of this patent is extended or adjusted under 35 U.S.C. 154(b) by 86 days.

(21) Appl. No.: 18/640,159

(22) Filed: Apr. 19, 2024

(65) Prior Publication Data

US 2025/0329176 A1 Oct. 23, 2025

(51) Int. Cl.

*G06V 20/62* (2022.01)
*G06F 3/14* (2006.01)
*G06V 30/10* (2022.01)

(52) U.S. Cl.

CPC .......... *G06V 20/635* (2022.01); *G06F 3/1454* (2013.01); *G06V 30/10* (2022.01)

(58) Field of Classification Search

CPC ..... G06F 3/1454; G06V 30/10; G06V 20/635
See application file for complete search history.

(56) References Cited

U.S. PATENT DOCUMENTS 12,100,393 B1 9/2024 Smith et al.
12,124,966 B1 10/2024 Alperin
2021/0183105 A1* 6/2021 Sneyers .................. G06F 40/20
2024/0371501 A1 11/2024 Perugupalli et al.
2025/0124094 A1* 4/2025 Trivedi .................. G06Q 10/10

OTHER PUBLICATIONS

Anonymous, “Tesseract OCR: What it is and Why Choose it in 2024,” Jan. 9, 2024, 9 pages, Klippa App B.V.
Kay Lack, “Labelling Coding Videos Using Tesseract OCR,” Feb. 4, 2023, 4 pages, web retrieval Nov. 26, 2024, https://www.herostrat.us/posts/labelling-coding-videos-using-tesseract.
Anonymous, “How to record your screen on Windows 11,” Mar. 6, 2023, 4 pages, web retrieval Nov. 26, 2024, https://www.microsoft.com/en-us/windows/learning-center/how-to-record-screen-windows-11#.

* cited by examiner

*Primary Examiner* — Amal S Zenati
(74) *Attorney, Agent, or Firm* — Van Hoven PC; Jordan Becker

(57) ABSTRACT

In an embodiment, a computer-implemented method is executed using processors of a computer system, and includes receiving a copy of a stored digital image comprising a screen capture of an application window displayed on the computing device while the computing device accesses or executes a videoconferencing application. The computer-implemented method includes executing an optical character recognition (OCR) process on the screen capture of the application window to identify natural language text characters included within the set of digital images, determining, based on the identified text characters, a set of information associated with text characters of the identified text characters, programmatically transmitting instructions for displaying components that can overlay the videoconferencing application executing on the computing device, programmatically instructing the computing device to redisplay the application window along with the components overlaying the videoconferencing application, such that the text characters are displayed as emphasized within the set of digital images.

21 Claims, 5 Drawing Sheets

TEXT DETECTION AND EXTRACTION FOR SHARED SCREEN PRESENTATIONS

COPYRIGHT NOTICE

A portion of this patent document's disclosure contains material subject to copyright protection. The copyright owner has no objection to the facsimile reproduction by anyone of the patent document or the patent disclosure, as it appears in the Patent and Trademark Office patent file or records, but otherwise reserves all copyright or rights. © 2023-2024 Grammarly, Inc.

TECHNICAL FIELD

One technical field of the present disclosure is computer screen sharing applications including videoconferencing applications. Other technical fields are generative artificial intelligence (AI) and text extraction.

BACKGROUND

The approaches described in this section are approaches that could be pursued but not necessarily approaches that have been previously conceived or pursued. Therefore, unless otherwise indicated, it should not be assumed that any of the approaches described in this section qualify as prior art merely by their inclusion in this section.

A videoconference, a videotelephony exchange, or other similar video-streaming application may generally include a live video-streaming conference that may be conducted amongst two or more remote participants, each utilizing their own personal electronic device. Particularly, videoconferences may allow two or more participants in different locations to conduct face-to-face meetings in real-time or near real-time without having to physically move into a proximate location of each other. In many instances, copious information in the form of presentations, video clips, images, business documents, and so forth may be presented and shared amongst participants during the videoconference. It may be thus useful to provide techniques to improve the presentation of information during videoconferences. Apart from videoconferences, other kinds of computer program applications may allow one computer user to share their screen with another computer user. Examples include remote service applications.

SUMMARY

The appended claims may serve as a summary of the invention.

DETAILED DESCRIPTION

1. General Overview

Figure 1:
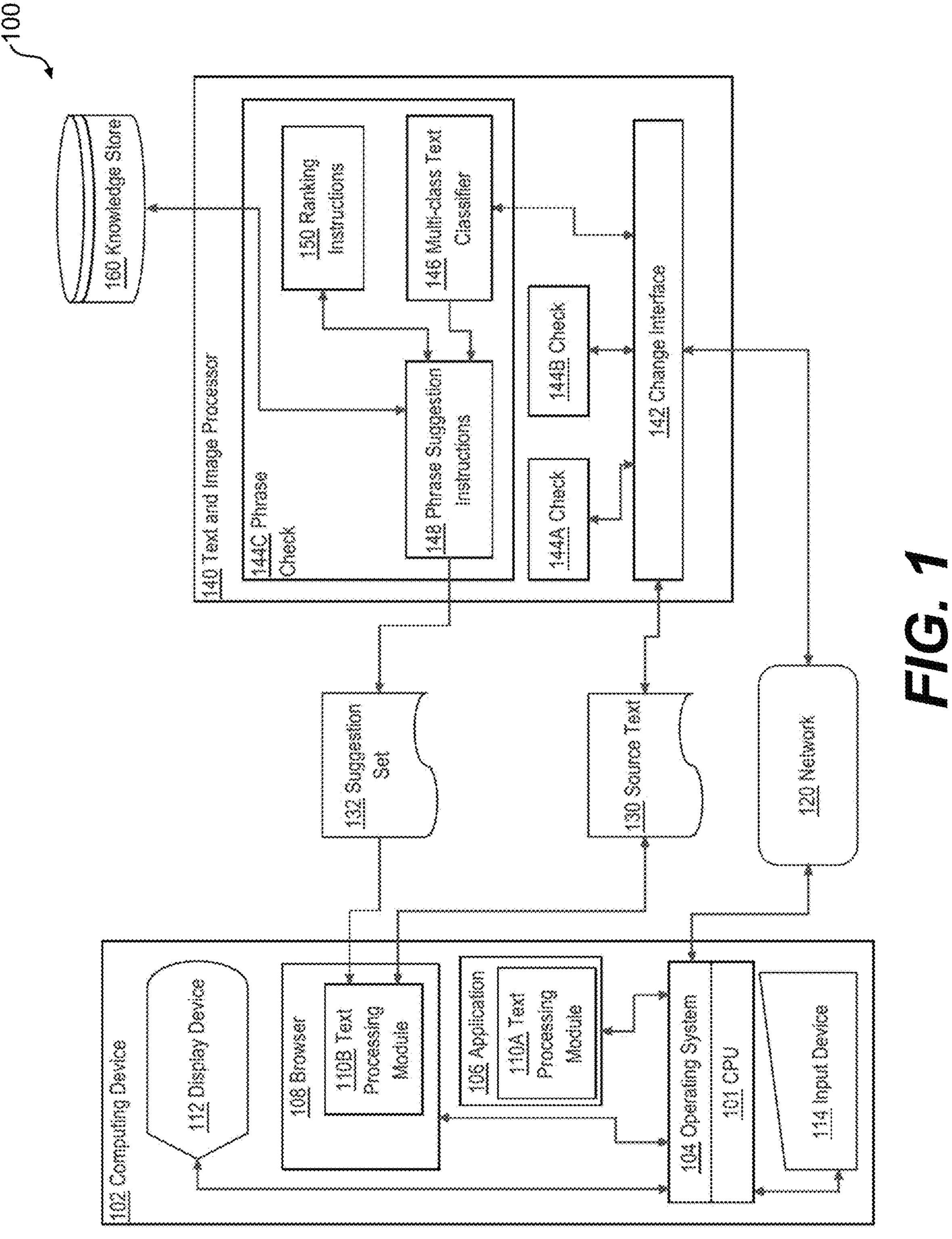
FIG. 1 illustrates a distributed computer system showing the context of use and principal functional elements with which one embodiment could be implemented.

In the following description, numerous specific details are outlined to provide a thorough understanding of the present invention. It will be apparent, however, that the present invention may be practiced without these specific details. In other instances, well-known structures and devices are shown in block diagram form to avoid unnecessarily obscuring the present invention.

The text of this disclosure, in combination with the drawing figures, is intended to state in prose the algorithms that are necessary to program the computer to implement the claimed inventions at the same level of detail that is used by people of skill in the arts to which this disclosure pertains to communicate with one another concerning functions to be programmed, inputs, transformations, outputs and other aspects of programming. That is, the level of detail outlined in this disclosure is the same level of detail that persons of skill in the art normally use to communicate with one another to express algorithms to be programmed or the structure and function of programs to implement the inventions claimed herein.

This disclosure may describe one or more different inventions, with alternative embodiments to illustrate examples. Other embodiments may be utilized, and structural, logical, software, electrical, and other changes may be made without departing from the scope of the particular inventions. Various modifications and alterations are possible and expected. Some features of one or more of the inventions may be described with reference to one or more particular embodiments or drawing figures, but such features are not limited to usage in the one or more particular embodiments or figures with reference to which they are described. Thus, the present disclosure is neither a literal description of all embodiments of one or more inventions nor a listing of features of one or more inventions that must be present in all embodiments.

Headings of sections and the title are provided for convenience but are not intended to limit the disclosure in any way or as a basis for interpreting the claims. Devices described as in communication with each other need not be in continuous communication with each other unless expressly specified otherwise. In addition, devices that communicate with each other may communicate directly or indirectly through one or more intermediaries, logical or physical.

A description of an embodiment with several components in communication with one other does not imply that all such components are required. Optional components may be described to illustrate a variety of possible embodiments and to illustrate one or more aspects of the inventions fully. Similarly, although process steps, method steps, algorithms, or the like may be described in sequential order, such processes, methods, and algorithms may generally be configured to work in different orders unless specifically stated to the contrary. Any sequence or order of steps described in this disclosure is not a required sequence or order. The steps of the described processes may be performed in any order practical. Further, some steps may be performed simultaneously. The illustration of a process in a drawing does not exclude variations and modifications, does not imply that the process or any of its steps are necessary to one or more of the invention(s), and does not imply that the illustrated process is preferred. The steps may be described once per embodiment but need not occur only once. Some steps may be omitted in some embodiments or occurrences, or some steps may be executed more than once in a given embodiment or occurrence. When a single device or article is described, more than one device or article may be used in place of a single device or article. Where more than one device or article is described, a single device or article may be used instead of more than one device or article.

The functionality or features of a device may be alternatively embodied by one or more other devices that are not explicitly described as having such functionality or features. Thus, other embodiments of one or more inventions need not include the device itself. Techniques and mechanisms described or referenced herein will sometimes be described in singular form for clarity. However, it should be noted that particular embodiments include multiple iterations of a technique or manifestations of a mechanism unless noted otherwise. Process descriptions or blocks in figures should be understood as representing modules, segments, or portions of code, including one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved.

Various embodiments encompass the subject matter of the following numbered clauses:

1. A computer-implemented method executed using one or more processors of a computer system, the computer-implemented method comprising:
 receiving, from a computing device, a copy of a stored digital image comprising a screen capture of an application window displayed on the computing device while the computing device accesses or executes a videoconferencing application, the screen capture of the application window comprising a set of digital images being presented in the videoconference; executing an optical character recognition (OCR) process on the screen capture of the application window to identify one or more natural language text characters included within the set of digital images; determining, based on the identified one or more text characters, a set of information associated with one or more text characters of the identified one or more text characters; programmatically transmitting to the computing device, based on the set of information associated with the one or more text characters, instructions for displaying one or more components that can overlay the videoconferencing application executing on the computing device, the one or more components being formatted to emphasize the one or more text characters as being associated with the set of information; programmatically instructing the computing device to redisplay the application window along with the one or more components overlaying the videoconferencing application, such that the one or more text characters are displayed as emphasized within the set of digital images.
2. The computer-implemented method of clause 1, wherein the one or more components for overlaying the videoconferencing application comprises one or more transparent application windows.
3. The computer-implemented method of clause 1, wherein receiving the screen capture of the application window comprises programmatically calling one or more application programming interfaces (APIs) to access a set of frames corresponding to the application window displayed on the computing device.
4. The computer-implemented method of clause 1, wherein executing the OCR process on the screen capture of the application window further comprises identifying a first set of pixel coordinates corresponding to a first region of pixels, the first region of pixels corresponding to the identified one or more text characters.
5. The computer-implemented method of clause 4, wherein executing the OCR process on the screen capture of the application window further comprises identifying a second set of pixel coordinates corresponding to a second region of pixels, the second region of pixels corresponding to the one or more text characters, and wherein the second region of pixels comprises a subset of the first region of pixels.
6. The computer-implemented method of clause 4, wherein executing the OCR process on the screen capture of the application window comprises programmatically calling an OCR service.
7. The computer-implemented method of clause 1, wherein programmatically transmitting the instructions for displaying the one or more components further comprises programmatically transmitting, to the computing device, instructions for displaying a highlight or a bounding geometry over the one or more text characters.
8. The computer-implemented method of clause 1, further comprising causing the computing device to redisplay the application window along with the one or more components overlaying the videoconferencing application during the execution of the videoconferencing application.

While certain embodiments are described in the context of videoconferencing, the use of a videoconference server, system, or facility is not required in all embodiments. Instead, the techniques of the disclosure can be applied to any distributed computer system, application server system, or program application that supports sharing the screen of one computer with another computer.

2. Structural & Functional Overview

2.1 Distributed Computer System Example

FIG. 1 illustrates a distributed computer system showing the context of use and principal functional elements with which one embodiment could be implemented. In certain embodiments, a computer system 100 may include components implemented at least partially by hardware at one or more computing devices, such as one or more hardware processors executing stored program instructions stored in one or more memories for performing the functions described herein. In other words, all functions described herein are intended to indicate operations performed using programming in a special or general-purpose computer in various embodiments. FIG. 1 illustrates only one of many possible arrangements of components configured to execute the programming described herein. Other arrangements may include fewer or different components, and the division of work between the components may vary depending on the arrangement.

FIG. 1, and the other drawing figures and all the description and claims in this disclosure, are intended to present, disclose, and claim a technical system and technical methods in which specially programmed computers, using a special-purpose distributed computer system design, execute functions that have not been available before to provide a practical application of computing technology to the problem of machine learning model development, validation, and deployment. In this manner, the disclosure presents a technical solution to a technical problem, and any interpretation of the disclosure or claims to cover any judicial exception to patent eligibility, such as an abstract idea, mental process, method of organizing human activity, or mathematical algorithm, has no support in this disclosure and is erroneous.

In the example of FIG. 1, a computing device 102 is communicatively coupled via a network 120 to a text and image processor 140. In one embodiment, computing device 102 may include a client-type computing device such as a personal computer, laptop, tablet, smartphone, or notebook computer. For purposes of illustrating a clear example, a single computing device 102, network 120, and text and image processor 140 are shown in FIG. 1, but practical embodiments may include thousands to millions of computing devices 102 distributed over a wide geographic area or over the globe, and hundreds to thousands of instances of text and image processor 140 to serve requests and computing requirements of the computing devices.

In certain embodiments, the computing device 102 may include, for example, a central processing unit (CPU) 101 coupled via a bus to a display device 112 and an input device 114. In some embodiments display device 112 and input device 114 are integrated, for example, using a touch-sensitive screen to implement a soft keyboard. CPU 101 hosts operating system 104, which may include a kernel, primitive services, a networking stack, and similar foundation elements implemented in software, firmware, or a combination. Operating system 104 supervises and manages one or more other programs. For the purpose of illustrating a clear example, FIG. 1 shows the operating system 104 coupled to an application 106 and a browser 108, but other embodiments may have more or fewer apps or applications hosted on computing device 102.

In one embodiment, at runtime, one or more of application 106 and browser 108 may load or be installed with a text processing module 110A, 110B, which comprises executable instructions that are compatible with text and image processor 140 and may implement application-specific communication protocols to rapidly communicate text-related commands and data between the module and the text processor. Text processing modules 110A and 110B may be implemented as runtime libraries, browser plug-ins, browser extensions, or other means of adding external functionality to otherwise unrelated third-party applications or software. The precise means of implementing a text processing module 110A, 110B or to obtain input text is not critical provided that, if text processing module 110A, 110B is implemented as an extension, then said extension is compatible with and can be functionally integrated with a host application 106 or browser 108. As explained further herein with more specificity, text processing modules 110A and 110B may also be implemented as a standalone application instead of an extension.

In some embodiments, a text processing module 110A may be installed as a standalone application that communicates programmatically with either or both operating system 104 and application 106. For example, in one implementation, text processing module 110A executes independently of application 106 and programmatically calls services or APIs of operating system 104 to obtain the text that has been entered in or is being entered in input fields that the application manages. Accessibility services or accessibility APIs of the operating system 104 may be called for this purpose. For example, an embodiment may call an accessibility API that normally obtains input text from the application 106 and outputs speech to audibly speak the text to the user but use the text obtained by the accessibility service in the processes that are described in FIG. 2, FIG. 3, and other sections herein. Examples of accessibility APIs that may be used for these purposes include UI Automation, IAccessible2, and OS X Accessibility.

In one embodiment, text processing module 110A, 110B may execute programmed instructions formatted to cause subscribing to one or more events provided by APIs, including one or more events provided by the aforementioned accessibility APIs. In various embodiments, the programmed instructions are formatted to cause subscribing to one or more APIs provided by an operating system 104, such as a WINDOWS or a MAC OS operating system. Such APIs may be referred to as "low-level" APIs. A text processing module can be programmed to programmatically subscribe to layout change, scroll, or other events. Such events may indicate a change in focused elements or a likelihood of different text being displayed on display device 112.

In some embodiments, events required for detecting new text displayed on display device 112 may not be received by text processing module 110A, 110B. In such embodiments, global event hooks (such as CGEventTap) may be programmatically implemented to observe mouse or trackpad input, and content updates may be triggered based on those observations. For example, text processing module 110A, 110B may be programmed to observe scroll events, mouse movement events, mouse button pressed events, arrow key pressed events, or other events and to schedule light-weight updates for such events. In certain embodiments, subsequent scroll events may be ignored while the update is being processed, and then it may be subsequently processed. In one embodiment, in the WINDOWS context, the equivalent functionality of CGEventTap may be accomplished using SendInput and SetWindowsHookEx.

In some embodiments, each text processing module 110A, 110B is linked, loaded with, or otherwise programmatically coupled to or with one or more of application 106 and browser 108 and, in this configuration, is capable of calling API calls, internal methods or functions, or other programmatic facilities of the application or browser. These calls or other invocations of methods or functions enable each text processing module 110A, 110B to detect text that is entered in input fields, windows, or panels of application 106 or browser 108, instruct the application or browser to delete a character, word, sentence, or another unit of text, and instruct the application or browser to insert a character, word, sentence, or another unit of text.

Each of the text processing modules 110A, 110B is programmed to interoperate with a host application 106 or browser 108 to detect the entry of text in a text entry function of the application or browser and/or changes in the entered text, to transmit changes in the text to text and image processor 140 for server-side checking and processing, to receive responsive data and commands from the text processor, and to execute presentation functions in cooperation with the host application or browser.

As one functional example, assume that browser 108 renders an HTML document with a text entry panel where a user can enter free-form text describing a product or service. The text processing module 110B is programmed to detect user selection of the text entry panel, the text entry, or changes in the text within the panel and to transmit all such text changes to text and image processor 140. In certain embodiments, each text processing module 110A, 110B is programmed to buffer or accumulate text changes locally over a programmable period, for example, five seconds, and to transmit the accumulated changes over that period as a batch to text and image processor 140. While not required, buffering or accumulation in this manner may improve performance by reducing network messaging roundtrips and reducing the likelihood that text changes could be lost due to packet drops in the networking infrastructure.

A commercial example of text processing modules 110A, 110B is the GRAMMARLY extension, commercially available from Grammarly, Inc.

Network 120 broadly represents one or more local area networks, wide area networks, campus networks, or internetworks in any combination, using links such as terrestrial or satellite, wired, or wireless network links.

In certain embodiments, the text and image processor 140 may include one or more server computers, workstations, computing clusters, and/or virtual machine processor instances, with or without network-attached storage or directly attached storage, located in any of enterprise premises, private datacenter, public data center and/or cloud computing center. The text and image processor 140 broadly represents a programmed server computer with processing throughput and storage capacity sufficient to communicate concurrently with thousands to millions of computing devices 102 associated with different users or accounts. For purposes of illustrating a clear example and focusing on innovations that are relevant to the appended claims, FIG. 1 omits basic hardware elements of text and image processor 140 such as a CPU, bus, I/O devices, main memory, and the like, illustrating instead an example software architecture for functional elements that execute on the hardware elements. Text and image processor 140 also may include foundational software elements not shown in FIG. 1, such as an operating system consisting of a kernel and primitive services, system services, a networking stack, an HTTP server, other presentation software, and other application software. Thus, text and image processor 140 may execute on the first computer, and text processing modules 110A and 110B may execute on a second computer.

In certain embodiments, the text and image processor 140 may include a change interface 142 coupled indirectly to network 120. Change interface 142 is programmed to receive the text changes that text processing modules 110A and 110B transmit to text and image processor 140 and to distribute the text changes to a plurality of different checks 144A, 144B, 144C. To illustrate a clear example, source text 130 of FIG. 1 represents one or more text changes that text processing module 110B transmits to change interface 142. In certain embodiments, change interface 142 is programmed to distribute every text change from a text processing module 110A, 110B to all of the checks 144A, 144B, 144C, which execute in parallel and/or in independent threads.

Thus, in one embodiment, the text and image processor 140 may be programmed to receive, from the computing device 102, a copy of a stored digital image comprising a screen capture of an application window displayed on the computing device 102 while the computing device 102 accesses or executes a videoconferencing application. Examples of videoconferencing applications include ZOOM, MICROSOFT TEAMS, BLUEJEANS, GOOGLE MEET, GoToMyPC, and functionally similar applications. In one embodiment, the videoconferencing application comprises SaaS-based or web-based software, and the computing device 102 accesses the videoconferencing application via the browser 108. Alternatively, the videoconferencing application can execute locally as the application 106.

The screen capture can be obtained by text processing module 110A programmatically calling a service or function of the operating system 104 to copy the then-current contents of video memory of the operating system or CPU and store, at least transiently, in transitory or non-transitory memory or disk storage, a digital image corresponding to the application window. The screen capture of the application window may include capturing a set of digital images presented in the videoconference. The text and image processor 140 may be further programmed to execute an optical character recognition (OCR) process on the screen capture of the application window to identify one or more text characters included within the set of digital images. The specific mechanism used programmatically to store a digital image corresponding to a screen capture of the application window is not critical.

The text and image processor 140 may be further programmed to determine, based on the identified one or more text characters, a set of information associated with one or more text characters of the identified one or more text characters and then to programmatically transmit to the computing device 102, based on the set of information associated with the one or more text characters, presentation instructions for displaying one or more components that can overlay the videoconferencing application executing on the computing device 102. The one or more components may be formatted or comprise presentation instructions to apply visual emphasis to the one or more text characters as being associated with the set of information. Examples of visual emphasis include colored highlighting, increased brightness, enlargement of characters, and coloring characters.

The text and image processor 140 may be further programmed to cause the computing device 102 to redisplay the application window along with the one or more components overlaying the videoconferencing application, such that the one or more text characters are displayed as emphasized within the set of digital images. This substep can comprise transmitting a refresh command to the computing device 102, transmitting vector drawing commands, transmitting tiles or raster data for presentation, or other display techniques.

Each of the checks 144A, 144B, 144C is programmed to execute a different form of checking or processing of a text change that has arrived. Example functions that checks 144A, 144B could be implemented include grammar checking, tone detection, spell checking, and translation. In certain embodiments, check 144C is programmed as a phrase check; therefore, it is also denoted "phrase check 144" in this description. In certain embodiments, phrase check 144 may include a multi-class text classifier coupled to phrase suggestion instructions 148, coupled to ranking instructions 150; however, other machine learning models can be used. For example, an embodiment may use several individual text classifiers ensembled together, or targeted rules may be programmed to find relevant words and then coupled to a classifier to approve or reject whether the instance of a word is correct, thus using a coarse rule followed by ML-based filtering.

Furthermore, phrase check 144C is coupled to, or can access, a knowledge store 160, which may be integrated with text and image processor 140 or implemented as separate storage. In certain embodiments, knowledge store 160 may include a database, flat file system, object store, or another digital data repository that stores a large number of textual phrase suggestions in association with category values or tags that specify a category or type of communication, text, or document in which the suggestions could be substituted. Thus, phrase check 144 and/or text and image processor 140 may be programmed for evaluating each particular source text unit among the plurality of source text units using a trained multi-class text classifier machine learning model and receiving a classification output from the multi-class text classifier that classifies each particular source text unit as a particular class of phrase among a plurality of possible classes of phrases. In certain embodiments, phrase suggestion instructions 148 are programmed, in part, to output a suggestion set 132 to transmit to text processing module 110B.

Figure 2:
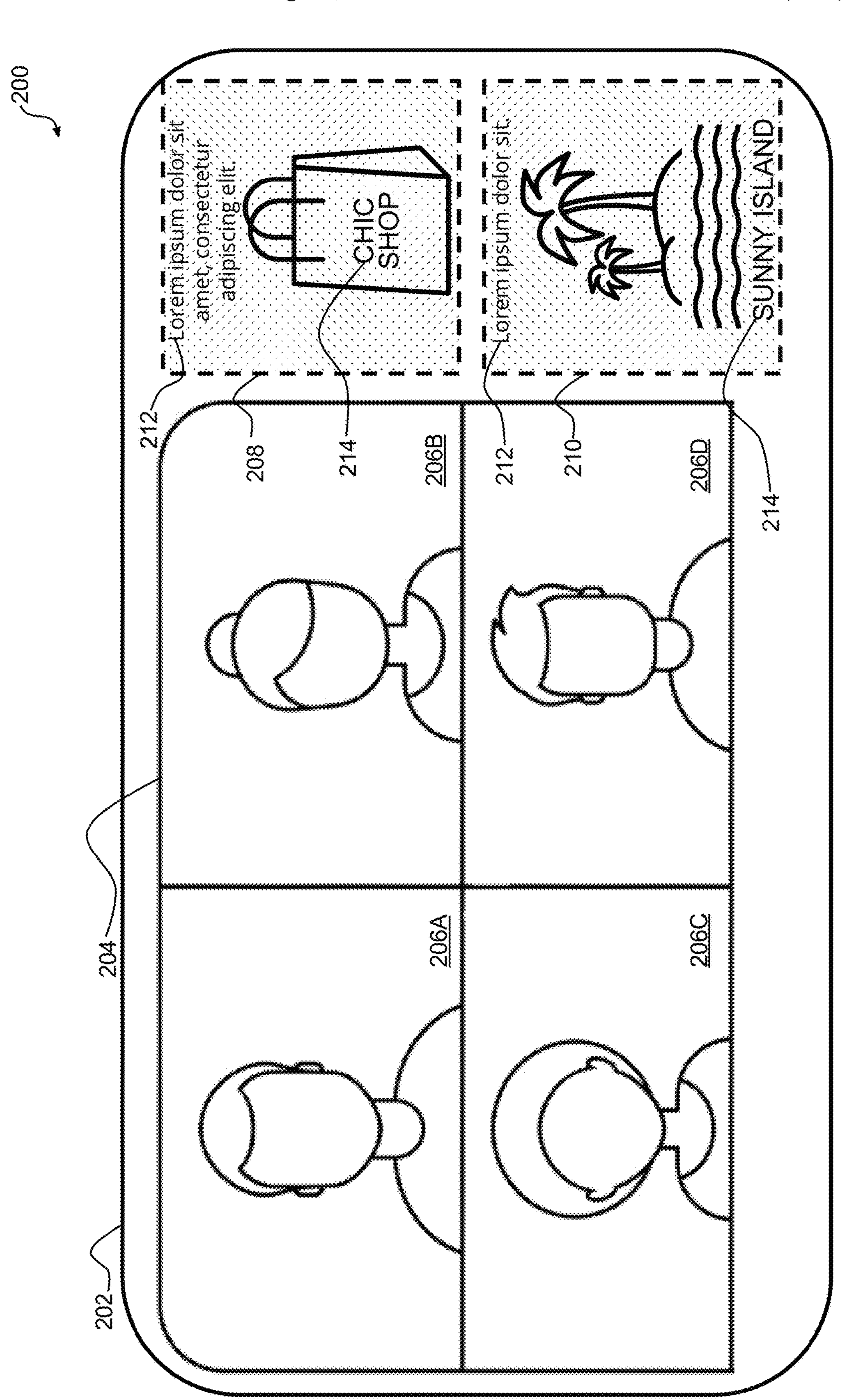
FIG. 2 illustrates an example user interface (UI) displaying videoconferences in which images include text to be detected and extracted.

2.2 User Interface Displaying Videoconferences in which Images Include Text to be Detected and Extracted FIG. 2 illustrates an example user interface (UI) 200 displaying videoconferences in which images include text to be extracted in accordance with the disclosed embodiments. As depicted in certain embodiments, the computing device 102 may display an application window 202, including a videoconferencing application executing on the computing device 102. For example, in one embodiment, a videoconference 204 may include any videoconferencing, videotelephony, or other video-streaming application in which several participants 206A, 206B, 206C, and 206D may interact in real-time or near real-time from respective remote locations. In certain embodiments, as further depicted in FIG. 2, the execution of a videoconference 204 can include digital images corresponding to the number of participants 206A, 206B, 206C, and 206D. For instance, in one example, the number of participants 206A, 206B, 206C, and 206D of the videoconference 204 may include several colleagues or acquaintances discussing and sharing a set of photos, for example, illustrating activities undergone during a recent vacation of one or more of the number of participants 206A, 206B, 206C, and 206D. It should be appreciated that the colorful example, as depicted in FIG. 2, is included merely for the purposes of illustration.

In other embodiments, the videoconference 204 may include any video-streaming application in which the set of digital images 208, 210 may be presented during the execution of the videoconference 204. For example, one image of the set of digital images 208, 210 can comprise an image of a screen of the computing device of a specific participant 206A, which that participant is sharing in the videoconference with the other participants. In one embodiment, the set of digital images 208, 210 may each include text characters 212, 214 that may be of particular interest to one or more the number of participants 206A, 206B, 206C, and 206D. Thus, in accordance with the presently disclosed embodiments, it may be useful to detect and extract the text characters 212, 214 from the set of digital images 208, 210 and further associate one or more sets of the text characters 212, 214 with a set of contextual information.

Figure 3:
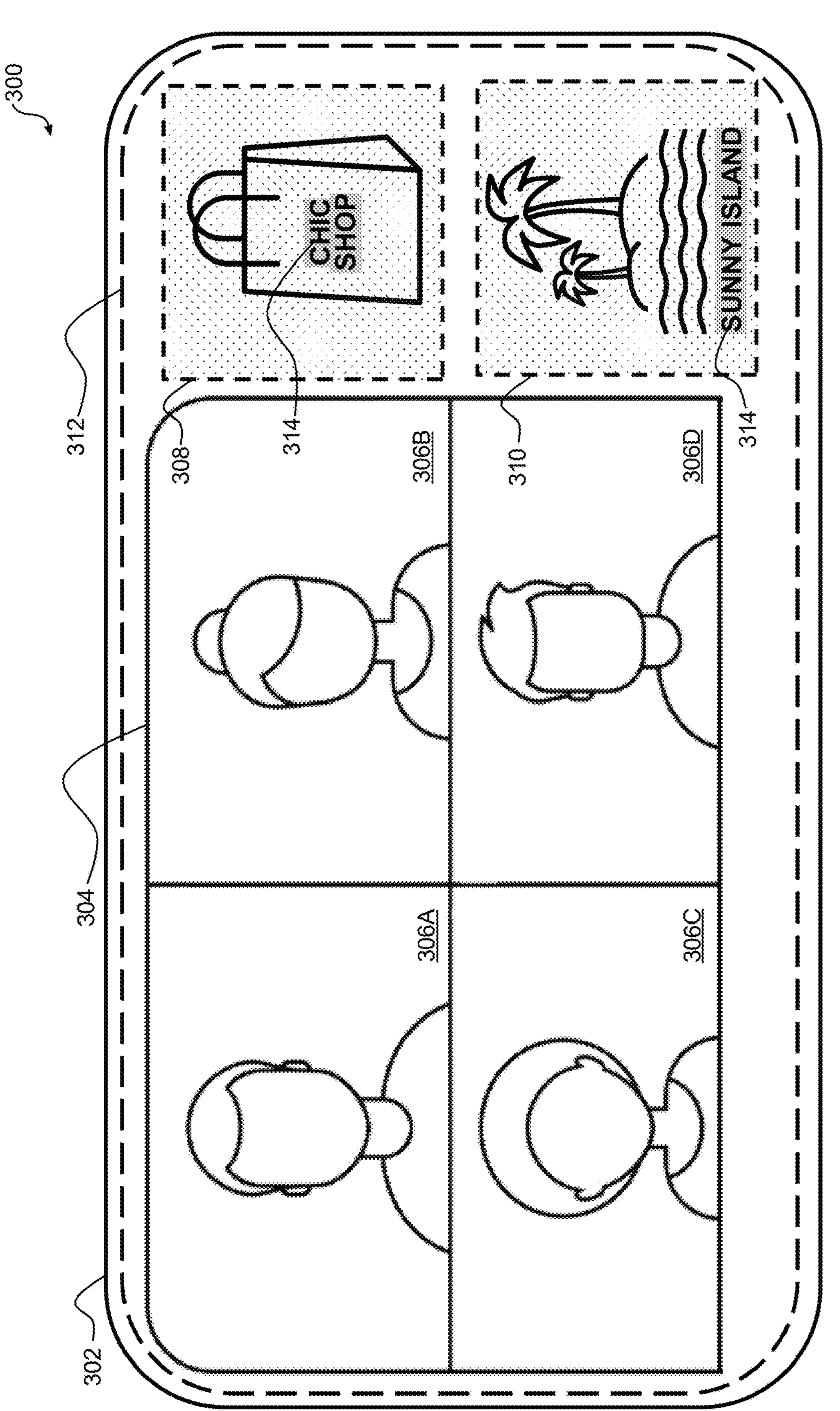
FIG. 3 illustrates an example user interface (UI) for automatically detecting and extracting text from images while executing videoconferences.

2.3 UI for Automatically Detecting and Extracting Text from Images During Videoconferences FIG. 3 illustrates an example user interface (UI) 300 for automatically detecting and extracting text from images during the execution of videoconferences in accordance with the disclosed embodiments. As depicted, in certain embodiments, the computing device 102 may display an application window 302, which may include a videoconferencing application executing on the computing device 102. For example, in one embodiment, a videoconference application 304 may include any videoconferencing, videotelephony, or other video-streaming application in which a plurality of participants 306A, 306B, 306C, and 306D may interact in real-time or near real-time from respective remote locations. In certain embodiments, as further depicted in FIG. 3, a set of digital images 308, 310 may be presented during the execution of the videoconference application 304.

In certain embodiments, the text and image processor 140 may receive a screen capture of the application window 302 displayed on the computing device 102 while executing the videoconference application 304. In one example, the screen capture of the application window 302 may include a capture of the set of digital images 308, 310. A shared screen presentation also can include a set of digital images corresponding to the number of participants 306A, 306B, 306C, and 306D. In certain embodiments, the text and image processor 140 may receive the screen capture of the application window 202 by utilizing one or more application programming interfaces (APIs) to access a set of frames corresponding to the application window 302 displayed on the computing device 102. In certain embodiments, upon receiving the screen capture of the application window 302, the text and image processor 140 may execute one or more optical character recognition (OCR) processes on the screen capture of the application window 302 to detect and extract the text characters 212, 214 as discussed above with respect to FIG. 2.

For example, the set of digital images 308, 310 may each include text characters 212, 214 that may be of particular interest to one or more of the number of participants 306A, 306B, 306C, and 306D. In one embodiment, the text and image processor 140 may be programmed to programmatically call an OCR service, such as the Tesseract® OCR engine or another OCR engine that may be suitable for detecting and extracting the text characters 212, 214. For example, in certain embodiments, the text and image processor 140 may execute the OCR process on the screen capture of the application window 202 by identifying a first set of pixel coordinates (e.g., $x_1$, $y_1$; $x_2$, $y_2$; $x_3$, $y_3$; . . . $x_N$, $y_N$) corresponding to a first region of pixels corresponding to text characters 212 and a second set of pixel coordinates (e.g., $u_1$, $v_1$; $u_2$, $v_2$; $u_3$, $v_3$; . . . $u_N$, $v_N$) corresponding to a second region of pixels corresponding to text characters 214. The OCR process can execute in the same computer or computing instance as the text processor 140 or can be executed using another computing device or virtual machine instance.

In one embodiment, upon detecting and extracting the text characters 212, 214 and identifying the first set of pixel coordinates (e.g., $x_1$, $y_1$; $x_2$, $y_2$; $x_3$, $y_3$; . . . $x_N$, $y_N$) and the second set of pixel coordinates (e.g., $u_1$, $v_1$; $u_2$, $v_2$; $u_3$, $v_3$; . . . $u_N$, $v_N$), the text and image processor 140 may access the knowledge store 160 and retrieve a set of information associated with one or more sets of text characters of the text characters 212, 214. For example, the text and image processor 140 may compare the detected and extracted text characters 212, 214 to one or more identifiers in the knowledge store 160 to identify any information that may be associated with one or more sets of text characters or text strings of the text characters 212, 214. As generally imparted by FIG. 3, in one example, the knowledge store 160 may include information that may be associated with the text characters 314. For example, the set of information stored by the knowledge store 160 may include, for example, any information suitable for contextualizing the one or more text characters 314, such as a definition of one or more identified terms, one or more key contacts, and/or hyperlinks to relevant documents.

In certain embodiments, upon identifying a set of information within the knowledge store 160 associated with the text characters 314, the text and image processor 140 may provide 102 instructions for displaying one or more components for overlaying the videoconferencing application 304 to the computing device 102. For example, in one embodiment, a component may include a transparent application window 312 that is instantiated in memory of the computing device 102 and associated with the videoconferencing application 304 as an overlay. The transparent application window 312 can be formatted to be entirely transparent except for a set of pixels corresponding to visually emphasized copies of the text characters 314. Consequently, when the transparent application window 312 is displayed concurrently with a window showing the videoconferencing application 304, the text characters 314 visually appear emphasized while the videoconferencing application 304 is executing on the computing device 102.

In one embodiment, as further shown in FIG. 3, the text characters 314 may be displayed within the set of digital images 308, 310, including a highlight or a bounding geometry over the text characters 314. In one embodiment, the highlight or bounding geometry may be programmatically configured to appear within the transparent application window 312 at the exact same pixel location at which the text characters 314 appear within the set of digital images 308, 310. Specifically, the highlight or bounding geometry may be programmatically configured to appear within the transparent application window 312 at a pixel location corresponding to, for example, the second set of pixel coordinates (e.g., $u_1$, $v_1$; $u_2$, $v_2$; $u_3$, $v_3$; . . . $u_N$, $v_N$).

Figure 4:
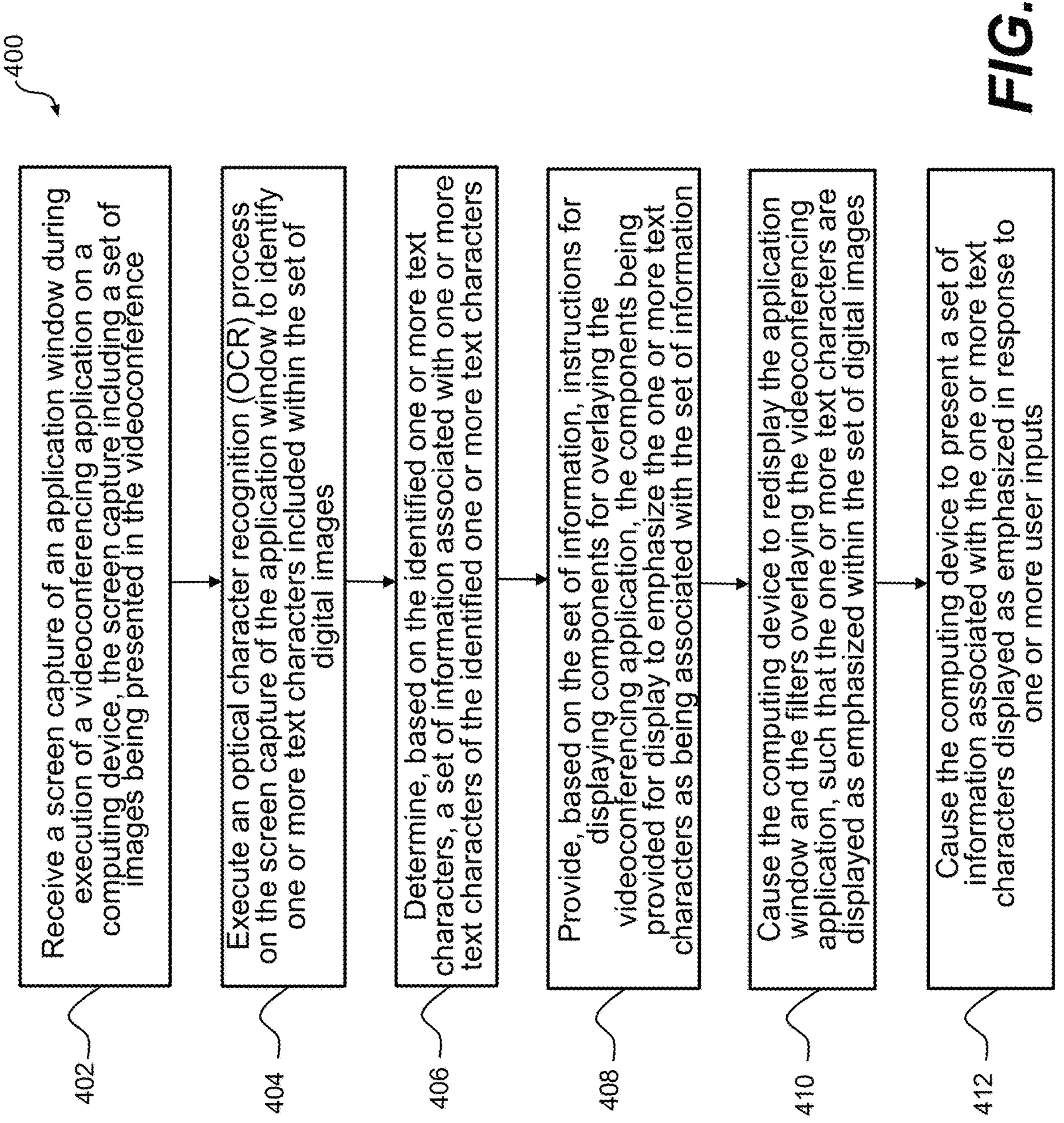
FIG. 4 illustrates a flow diagram of an example method for automatically detecting and extracting text from images during the execution of videoconferences.

2.4 Method for Automatically Detecting and Extracting Text from Images During Videoconferences FIG. 4 illustrates a flow diagram of an example method for automatically extracting text from images during the execution of videoconferencing applications in accordance with the disclosed embodiments. FIG. 4 and each other flow diagram herein are intended as an illustration of the functional level at which skilled persons, in the art to which this disclosure pertains, communicate with one another to describe and implement a computer-implemented method, as described further herein and/or algorithms using programming. The flow diagrams are not intended to illustrate every instruction, method object, or sub-step that would be needed to program every aspect of a working program but are provided at the same functional level of illustration that is normally used at the high level of skill in this art to communicate the basis of developing working programs.

In one embodiment, a method 400 may be performed utilizing one or more processing devices (e.g., text and image processor 140 as discussed above with respect to FIG. 1) that may include hardware (e.g., a general-purpose processor, a graphic processing unit (GPU), an application-specific integrated circuit (ASIC), a system-on-chip (SoC), a microcontroller, a field-programmable gate array (FPGA), a central processing unit (CPU), an application processor (AP), a visual processing unit (VPU), a neural processing unit (NPU), a neural decision processor (NDP), a deep learning processor (DLP), a tensor processing unit (TPU), a neuromorphic processing unit (NPU), or any other artificial intelligence (AI) accelerator device(s) that may be suitable for processing natural language data and making one or more predictions or decisions based thereon), firmware (e.g., microcode), or some combination thereof.

The method 400 may begin at block 402 with the one or more processors (e.g., text and image processor 140) receiving, from a computing device 102, a screen capture of an application window displayed on the computing device 102 while the computing device 102 accesses or executes a videoconferencing application. For example, the screen capture of the application window 202 may include a capture of a set of digital images 208, 210 is presented in the videoconference 204. In certain embodiments, the text and image processor 140 may receive the screen capture of the application window 202 by utilizing one or more application programming interfaces (APIs) to access a set of frames corresponding to the application window 202 displayed on the computing device 102.

The method 400 may continue at block 404 with one or more processors executing an optical character recognition (OCR) process on the screen capture of the application window to identify one or more text characters included within the set of digital images. In one embodiment, the text and image processor 140 directly executes an OCR process. In another embodiment, the text and image processor 140 programmatically calls or invokes an OCR process that executes elsewhere, such as in a virtual compute instance or a cloud computing center, or another computer of a networked server computer system. For example, in one embodiment, the text and image processor 140 may call and/or execute the TESSERACT OCR engine using the version of TESSERACT open-source code available online as of the filing date of this disclosure via the GITHUB system via the path tesseract-ocr/tesseract. In certain embodiments, the text and image processor 140 may execute the OCR process on the screen capture of the application window 202 by identifying a first set of pixel coordinates (e.g., $x_1$, $y_1$; $x_2$, $y_2$; $x_3$, $y_3$; . . . $x_N$, $y_N$) corresponding to a first region of pixels.

For example, the first region of pixels may correspond to one or more text characters 212, 214 identified within the set of digital images 208, 210. In another embodiment, the text and image processor 140 may further execute the OCR process on the screen capture of the application window 202 to identify a second set of pixel coordinates (e.g., $u_1$, $v_1$; $u_2$, $v_2$; $u_3$, $v_3$; . . . $u_N$, $v_N$) corresponding to a second region of pixels. For example, the second region of pixels may correspond to one or more text characters 214, which may include a subset of the larger set of the identified one or more text characters 212, 214.

Method 400 may continue at block 406 with one or more processors (e.g., text and image processor 140) determining, based on the identified one or more text characters, a set of information associated with one or more text characters of the identified one or more text characters. For example, in certain embodiments, the text and image processor 140 may access the knowledge store 160 and retrieve a set of information associated with the one or more text characters 214. In one embodiment, the set of information may include, for example, any information suitable for contextualizing the one or more text characters 214, such as a definition of one or more identified terms, one or more key contacts, and/or hyperlinks to relevant documents.

The method 400 may then continue at block 408 with the one or more processors (e.g., text and image processor 140) providing, to the computing device, and based on the set of information associated with the one or more text characters, instructions for displaying one or more components for overlaying the videoconferencing application executing on the computing device. In certain embodiments, one or more components may be associated with a transparent application window 312 that may be provided for overlaying the videoconferencing application 304, such that one or more text characters 314 are emphasized while the videoconferencing application 304 is executing on the computing device 102.

The method 400 may continue at block 410 with the one or more processors (e.g., text and image processor 140) causing the computing device to redisplay the application window along with the one or more components overlaying the videoconferencing application, such that the one or more text characters are emphasized within the set of digital images. For example, in some embodiments, the text and image processor 140 may provide to the computing device 102 the transparent application window 312 for overlaying the videoconferencing application 304, such that the one or more text characters 314 are emphasized while the videoconferencing application 304 is executing on the computing device 102.

In one embodiment, the one or more text characters 314 may be displayed within the set of digital images 308, 310, including a highlight or a bounding geometry over the one or more text characters 314. For example, in one embodiment, the highlight or bounding geometry may be programmatically configured to appear within the transparent application window 312 at the exact same pixel location at which one or more text characters 314 appear within the set of digital images 308, 310. Specifically, the highlight or bounding geometry may be programmatically configured to appear within the transparent application window 312 at a pixel location corresponding to, for example, the second set of pixel coordinates (e.g., $u_1$, $v_1$; $u_2$, $v_2$; $u_3$, $v_3$; . . . $u_N$, $v_N$).

The visual emphasis achieved via block 410 can facilitate the retrieval of stored information corresponding to the emphasized text characters. For example, when a participant 206A is sharing their screen in a videoconference so that one image of the set of digital images 208, 210 corresponds to the shared screen, the visual emphasis achieved via method 400 can cue the participant to retrieve the related information that was determined at step 406.

The method 400 may conclude at block 412 with the one or more processors (e.g., text and image processor 140) causing the computing device to present a set of information associated with the one or more text characters emphasized within the set of digital images in response to one or more user inputs. For example, in response to one or more user inputs by a presenter participant of the number of participants 206A, 206B, 206C, and 206D, in which the presenter participant selects the text characters 314 emphasized within the set of digital images 208, 210, the computing device 102 may present and display a set of information stored by the knowledge store 160. For example, as discussed above with respect to FIG. 3, the set of information associated with the text characters 314 emphasized within the set of digital images 208, 210 may include, for example, any information suitable for contextualizing the one or more text characters 314, such as a definition of one or more identified terms, one or more key contacts, and/or hyperlinks to relevant documents.

In one embodiment, the text characters 314 emphasized within the set of digital images 208, 210 may be displayed to each of the number of participants 206A, 206B, 206C, and 206D on their respective computing devices 102, and may be further selectable by each of the number of participants 206A, 206B, 206C, and 206D on their respective computing devices 102. In another embodiment, the text characters 314 emphasized within the set of digital images 208, 210 may be displayed to each of the number of participants 206A, 206B, 206C, and 206D on their respective computing devices 102, but may be selectable by only the presenter participant of the number of participants 206A, 206B, 206C, and 206D. In yet another embodiment, the number of participants 206A, 206B, 206C, and 206D may each be displayed different emphasized text characters 314 based on, for example, their respective applications 106 executing on their respective computing devices 102 each in communication with the text and image processor 140.

3. Implementation Example—Hardware Overview

According to one embodiment, the techniques described herein are implemented by at least one computing device. The techniques may be implemented in whole or in part using a combination of at least one server computer and/or other computing devices coupled using a network, such as a packet data network. The computing devices may be hard-wired to perform the techniques or may include digital electronic devices such as at least one application-specific integrated circuit (ASIC) or field programmable gate array (FPGA) that is persistently programmed to perform the techniques or may include at least one general purpose hardware processor programmed to perform the techniques pursuant to program instructions in firmware, memory, other storage, or a combination. To accomplish the described techniques, such computing devices may combine custom hard-wired logic, ASICs, or FPGAs with custom programming. The computing devices may be server computers, workstations, personal computers, portable computer systems, handheld devices, mobile computing devices, wearable devices, body-mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 5:
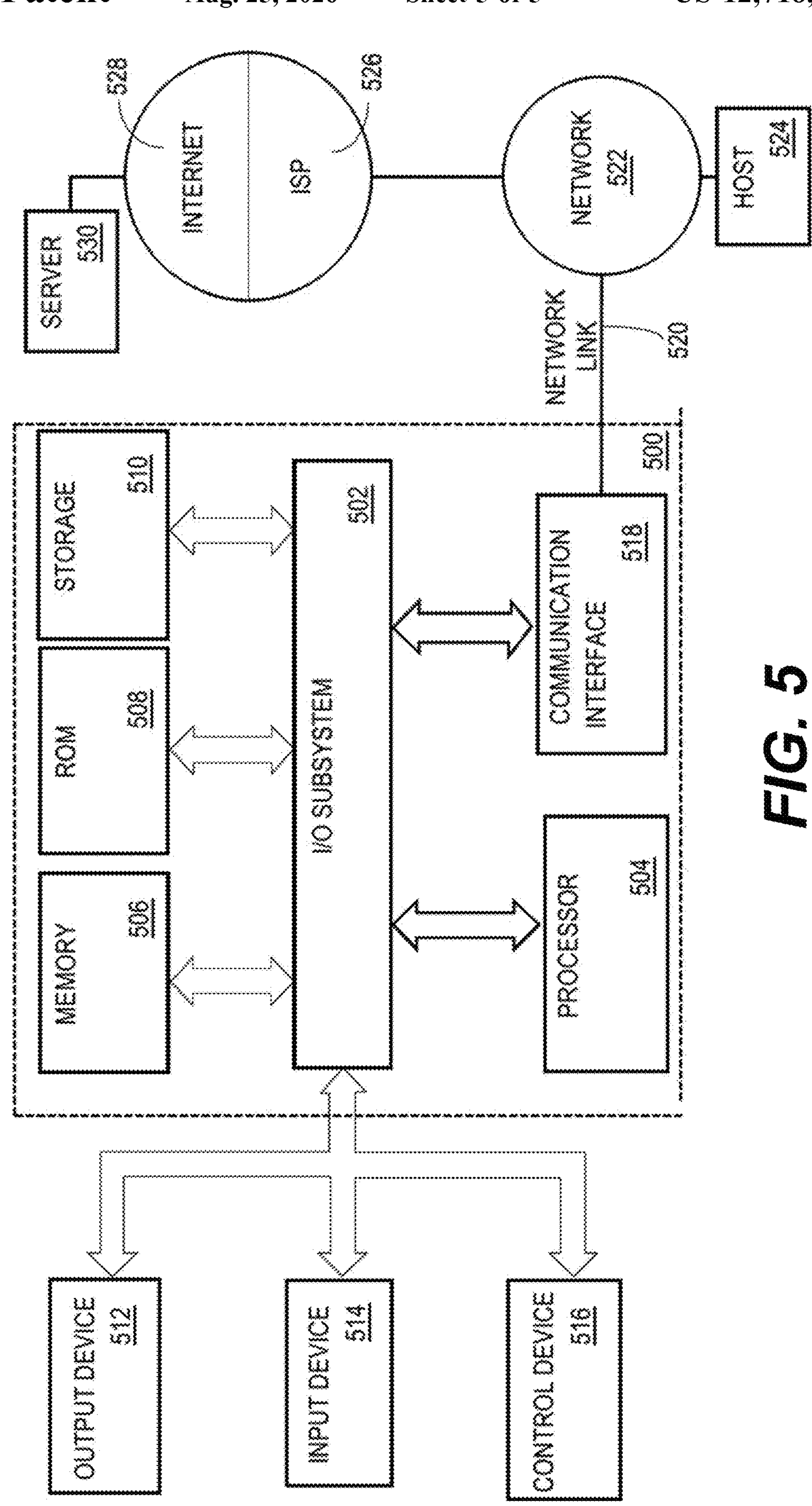
FIG. 5 illustrates a computer system that could be used to implement aspects of one embodiment.

FIG. 5 is a block diagram that illustrates an example computer system with which an embodiment may be implemented. In the example of FIG. 5, a computer system 500 and instructions for implementing the disclosed technologies in hardware, software, or a combination of hardware and software are represented schematically, for example, as boxes and circles, at the same level of detail that is commonly used by persons of ordinary skill in the art to which this disclosure pertains for communicating about computer architecture and computer systems implementations.

Computer system 500 includes an input/output (I/O) subsystem 502, which may include a bus and/or other communication mechanism(s) for communicating information and/or instructions between the components of the computer system 500 over electronic signal paths. The I/O subsystem 502 may include an I/O controller, a memory controller, and at least one I/O port. The electronic signal paths, such as lines, unidirectional arrows, or bidirectional arrows, are represented schematically in the drawings.

At least one hardware processor 504 is coupled to I/O subsystem 502 for processing information and instructions. Hardware processor 504 may include, for example, a general-purpose microprocessor or microcontroller and/or a special-purpose microprocessor such as an embedded system, a graphics processing unit (GPU), a digital signal processor, or ARM processor. Processor 504 may comprise an integrated arithmetic logic unit (ALU) or be coupled to a separate ALU.

Computer system 500 includes one or more units of memory 506, such as a main memory, coupled to I/O subsystem 502 for electronically digitally storing data and instructions to be executed by processor 504. Memory 506 may include volatile memory such as various forms of random-access memory (RAM) or other dynamic storage device. Memory 506 may also be used for storing temporary variables or other intermediate information during the execution of instructions to be executed by processor 504. Such instructions, when stored in non-transitory computer-readable storage media accessible to processor 504, can render computer system 500 into a special-purpose machine customized to perform the operations specified in the instructions.

Computer system 500 includes non-volatile memory such as read-only memory (ROM) 508 or other static storage devices coupled to I/O subsystem 502 for storing information and instructions for processor 504. The ROM 508 may include various forms of programmable ROM (PROM), such as erasable PROM (EPROM) or electrically erasable PROM (EEPROM). A unit of persistent storage 510 may include various forms of non-volatile RAM (NVRAM), such as FLASH memory, solid-state storage, magnetic disk, or optical disks such as CD-ROM or DVD-ROM and may be coupled to I/O subsystem 502 for storing information and instructions. Storage 510 is an example of a non-transitory computer-readable medium that may be used to store instructions and data which, when executed by the processor 504, cause performing computer-implemented methods to execute the techniques herein.

The instructions in memory 506, ROM 508, or storage 510 may comprise one or more instructions organized as modules, methods, objects, functions, routines, or calls. The instructions may be organized as one or more computer programs, operating system services, or application programs, including mobile apps. The instructions may comprise an operating system and/or system software; one or more libraries to support multimedia, programming, or other functions; data protocol instructions or stacks to implement TCP/IP, HTTP, or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server, or web client. The instructions may be organized as a presentation, application, and data storage layer, such as a relational database system using a structured query language (SQL) or no SQL, an object store, a graph database, a flat file system, or other data storage.

Computer system 500 may be coupled via I/O subsystem 502 to at least one output device 512. In one embodiment, output device 512 is a digital computer display. Examples of a display that may be used in various embodiments include a touchscreen display, a light-emitting diode (LED) display, a liquid crystal display (LCD), or an e-paper display. Computer system 500 may include other type(s) of output devices 512, alternatively or in addition to a display device. Examples of other output devices 512 include printers, ticket printers, plotters, projectors, sound cards or video cards, speakers, buzzers or piezoelectric devices or other audible devices, lamps or LED or LCD indicators, haptic devices, actuators or servos.

At least one input device 514 is coupled to I/O subsystem 502 for communicating signals, data, command selections, or gestures to processor 504. Examples of input devices 514 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 516, which may perform cursor control or other automated control functions such as navigation in a graphical interface on a display screen, alternatively or in addition to input functions. The control device 516 may be a touchpad, a mouse, a trackball, or cursor direction keys for communicating direction information and command selections to processor 504 and for controlling cursor movement on an output device 512, such as a display. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism, or other control device. An input device 514 may include a combination of multiple input devices, such as a video camera and a depth sensor.

In another embodiment, computer system 500 may comprise an Internet of Things (IoT) device in which one or more of the output device 512, input device 514, and control device 516 are omitted. Or, in such an embodiment, the input device 514 may comprise one or more cameras, motion detectors, thermometers, microphones, seismic detectors, other sensors or detectors, measurement devices or encoders, and the output device 512 may comprise a special-purpose display such as a single-line LED or LCD display, one or more indicators, a display panel, a meter, a valve, a solenoid, an actuator or a servo.

When computer system 500 is a mobile computing device, input device 514 may comprise a global positioning system (GPS) receiver coupled to a GPS module that is capable of triangulating to a plurality of GPS satellites, determining and generating geo-location or position data such as latitude-longitude values for a geophysical location of the computer system 500. Output device 512 may include hardware, software, firmware, and interfaces for generating position reporting packets, notifications, pulse or heartbeat signals, or other recurring data transmissions that specify a position of the computer system 500, alone or in combination with other application-specific data, directed toward host computer 524 or server computer 530.

Computer system 500 may implement the techniques described herein using customized hard-wired logic, at least one ASIC or FPGA, firmware, and/or program instructions or logic which, when loaded and used or executed in combination with the computer system, causes or programs the computer system to operate as a special-purpose machine. According to one embodiment, the techniques herein are performed by computer system 500 in response to processor 504 executing at least one sequence of at least one instruction contained in main memory 506. Such instructions may be read into main memory 506 from another storage medium, such as storage 510. Execution of the sequences of instructions contained in main memory 506 causes processor 504 to perform the process steps described herein. In alternative embodiments, hard-wired circuitry may be used in place of or in combination with software instructions.

The term "storage media," as used herein, refers to any non-transitory media that store data and/or instructions that cause a machine to operate in a specific fashion. Such storage media may comprise non-volatile media and/or volatile media. Non-volatile media includes, for example, optical or magnetic disks, such as storage 510. Volatile media includes dynamic memory, such as memory 506. Common forms of storage media include, for example, a hard disk, solid state drive, flash drive, magnetic data storage medium, any optical or physical data storage medium, memory chip, or the like.

Storage media is distinct but may be used with transmission media. Transmission media participates in transferring information between storage media. For example, transmission media includes coaxial cables, copper wire and fiber optics, and wires comprising a bus of I/O subsystem 502. Transmission media can also be acoustic or light waves generated during radio-wave and infrared data communications.

Various forms of media may carry at least one sequence of at least one instruction to processor 504 for execution. For example, the instructions may initially be carried on a remote computer's magnetic disk or solid-state drive. The remote computer can load the instructions into its dynamic memory and send them over a communication link such as a fiber optic, coaxial cable, or telephone line using a modem. A modem or router local to computer system 500 can receive the data on the communication link and convert the data to a format that can be read by computer system 500. For instance, a receiver such as a radio frequency antenna or an infrared detector can receive the data from a wireless or optical signal. Appropriate circuitry can provide the data to I/O subsystem 502, such as placing the data on a bus. I/O subsystem 502 carries the data to memory 506, from which processor 504 retrieves and executes the instructions. The instructions received by memory 506 may optionally be stored on storage 510 before or after execution by processor 504.

Computer system 500 also includes a communication interface 518 coupled to a bus or I/O subsystem 502. Communication interface 518 provides a two-way data communication coupling to a network link(s) 520 directly or indirectly connected to at least one communication network, such as a network 522 or a public or private cloud on the Internet. For example, communication interface 518 may be an Ethernet networking interface, integrated-services digital network (ISDN) card, cable modem, satellite modem, or a modem to provide a data communication connection to a corresponding type of communications line, for example, an Ethernet cable or a metal cable of any kind or a fiber-optic line or a telephone line. Network 522 broadly represents a local area network (LAN), wide-area network (WAN), campus network, internetwork, or any combination thereof. Communication interface 518 may comprise a LAN card to provide a data communication connection to a compatible LAN, a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 518 sends and receives electrical, electromagnetic, or optical signals over signal paths that carry digital data streams representing various types of information.

Network link 520 typically provides electrical, electromagnetic, or optical data communication directly or through at least one network to other data devices, using, for example, satellite, cellular, Wi-Fi, or BLUETOOTH technology. For example, network link 520 may connect through network 522 to a host computer 524.

Furthermore, network link 520 may connect through network 522 or to other computing devices via internetworking devices and/or computers operated by an Internet Service Provider (ISP) 526. ISP 526 provides data communication services through a worldwide packet data communication network called Internet 528528. A server computer 530 may be coupled to Internet 528528. Server computer 530 broadly represents any computer, data center, virtual machine, or virtual computing instance with or without a hypervisor or computer executing a containerized program system such as DOCKER or KUBERNETES. Server computer 530 may represent an electronic digital service that is implemented using more than one computer or instance and that is accessed and used by transmitting web services requests, uniform resource locator (URL) strings with parameters in HTTP payloads, API calls, app services calls, or other service calls. Computer system 500 and server computer 530 may form elements of a distributed computer system that includes other computers, a processing cluster, a server farm, or other organizations of computers that cooperate to perform tasks or execute applications or services. Server computer 530 may comprise one or more instructions organized as modules, methods, objects, functions, routines, or calls. The instructions may be organized as one or more computer programs, operating system services, or application programs, including mobile apps. The instructions may comprise an operating system and/or system software; one or more libraries to support multimedia, programming, or other functions; data protocol instructions or stacks to implement TCP/IP, HTTP, or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server computer 530 may comprise a web application server that hosts a presentation layer, application layer, and data storage layer, such as a relational database system using a structured query language (SQL) or no SQL, an object store, a graph database, a flat file system or other data storage.

Computer system 500 can send messages and receive data and instructions, including program code, through the network(s), network link 520, and communication interface 518. In the Internet example, server computer 530 might transmit a requested code for an application program through Internet 528528, ISP 526, local network 522, and communication interface 518. The received code may be executed by processor 504 as it is received and/or stored in storage 510 or other non-volatile storage for later execution.

The execution of instructions, as described in this section, may implement a process in the form of an instance of a computer program that is being executed and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 504. While each processor 504 or core of the processor executes a single task at a time, computer system 500 may be programmed to implement multitasking to allow each processor to switch between tasks that are being executed without having to wait for each task to finish. In certain embodiments, switches may be performed when tasks perform input/output operations when a task indicates that it can be switched or on hardware interrupts. Time-sharing may be implemented to allow fast response for interactive user applications by rapidly performing context switches to provide the appearance of concurrent execution of multiple processes. In certain embodiments, an operating system may prevent direct communication between independent processes, providing strictly mediated and controlled inter-process communication functionality for security and reliability.

In the foregoing specification, embodiments of the invention have been described with reference to numerous specific details that may vary from implementation to implementation. Accordingly, the specification and drawings are to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method executed using one or more processors of a computer system, the computer-implemented method comprising:

receiving, from a computing device, at least a portion of a screen capture of an application window displayed on the computing device while the computing device accesses or executes a videoconferencing application during a videoconference, the at least a portion of the screen capture of the application window comprising a set of digital images being presented in the videoconference;

executing an optical character recognition (OCR) process on the at least a portion of the screen capture of the application window to identify one or more natural language text characters included within the set of digital images;

accessing a knowledge store to identify a set of stored information associated with one or more text characters of the identified one or more natural language text characters, wherein accessing the knowledge store to identify the set of stored information is performed in response to the identifying of the one or more natural language text characters by the OCR process and without any requirement of a user request for information associated with the one or more text characters;

programmatically transmitting to the computing device, in response to the identifying of the set of stored information associated with the one or more text characters, instructions for displaying one or more components that can overlay the videoconferencing application executing on the computing device, the one or more components being formatted to emphasize the one or more text characters as an indication that an association has been identified between the one or more text characters and the set of information; and programmatically instructing the computing device to redisplay the application window along with the one or more components overlaying the videoconferencing application, such that the one or more text characters are displayed as emphasized within the set of digital images as the indication that an association has been identified between the one or more text characters and the set of information.

2. The computer-implemented method of claim 1, wherein the one or more components for overlaying the videoconferencing application comprises one or more transparent application windows.

3. The computer-implemented method of claim 1, wherein receiving the at least a portion of the screen capture of the application window comprises programmatically calling one or more application programming interfaces (APIs) to access a set of frames corresponding to the application window displayed on the computing device.

4. The computer-implemented method of claim 1, wherein executing the OCR process on the at least a portion of the screen capture of the application window further comprises identifying a first set of pixel coordinates corresponding to a first region of pixels, the first region of pixels corresponding to the identified one or more text characters.

5. The computer-implemented method of claim 4, wherein executing the OCR process on the at least a portion of the screen capture of the application window further comprises identifying a second set of pixel coordinates corresponding to a second region of pixels, the second region of pixels corresponding to the one or more text characters, and wherein the second region of pixels comprises a subset of the first region of pixels.

6. The computer-implemented method of claim 4, wherein executing the OCR process on the at least a portion of the screen capture of the application window comprises programmatically calling an OCR service.

7. The computer-implemented method of claim 1, wherein programmatically transmitting the instructions for displaying the one or more components further comprises programmatically transmitting, to the computing device, instructions for displaying a highlight or a bounding geometry over the one or more text characters.

8. The computer-implemented method of claim 1, further comprising causing the computing device to redisplay the application window along with the one or more components overlaying the videoconferencing application during the execution of the videoconferencing application.

9. One or more non-transitory computer-readable storage media storing one or more sequences of instructions which, when executed using one or more processors of a computer system, cause the one or more processors to execute:

receiving, from a computing device, at least a portion of a screen capture of an application window displayed on the computing device while the computing device accesses or executes a videoconferencing application during a videoconference, the at least a portion of the screen capture of the application window comprising a set of digital images being presented in the videoconference;

executing an optical character recognition (OCR) process on the at least a portion of the screen capture of the application window to identify one or more natural language text characters included within the set of digital images;

accessing a knowledge store to identify a set of stored information associated with one or more text characters of the identified one or more natural language text characters, wherein accessing the knowledge store to identify the set of stored information is performed in response to the identifying of the one or more natural language text characters by the OCR process and without any requirement of a user request for information associated with the one or more text characters;

programmatically transmitting to the computing device, in response to the identifying of the set of stored information associated with the one or more text characters, instructions for displaying one or more components that can overlay the videoconferencing application executing on the computing device, the one or more components being formatted to emphasize the one or more text characters as an indication that an association has been identified between the one or more text characters and the set of information; and programmatically instructing the computing device to redisplay the application window along with the one or more components overlaying the videoconferencing application, such that the one or more text characters are displayed as emphasized within the set of digital images as the indication that an association has been identified between the one or more text characters and the set of information.

10. The one or more non-transitory computer-readable storage media of claim 9, wherein the one or more components for overlaying the videoconferencing application comprises one or more transparent application windows.

11. The one or more non-transitory computer-readable storage media of claim 9, wherein receiving the at least a portion of the screen capture of the application window comprises utilizing one or more application programming interfaces (APIs) to access a set of frames corresponding to the application window displayed on the computing device.

12. The one or more non-transitory computer-readable storage media of claim 9, wherein executing the OCR process on the at least a portion of the screen capture of the application window further comprises identifying a first set of pixel coordinates corresponding to a first region of pixels, the first region of pixels corresponding to the identified one or more text characters.

13. The one or more non-transitory computer-readable storage media of claim 12, wherein executing the OCR process on the at least a portion of the screen capture of the application window further comprises identifying a second set of pixel coordinates corresponding to a second region of pixels, the second region of pixels corresponding to the one or more text characters, and wherein the second region of pixels comprises a subset of the first region of pixels.

14. The one or more non-transitory computer-readable storage media of claim 9, wherein providing the instructions for displaying the one or more components further comprises providing, to the computing device, instructions for displaying a highlight or a bounding geometry over the one or more text characters.

15. The one or more non-transitory computer-readable storage media of claim 9, further comprising causing the computing device to redisplay the application window along with the one or more components overlaying the videoconferencing application during the execution of the videoconferencing application.

16. A computer system, comprising:

one or more processors; and one or more non-transitory computer-readable storage media storing one or more sequences of instructions which, when executed using the one or more processors, cause the one or more processors to execute:

receiving, from a computing device, at least a portion of a screen capture of an application window displayed on the computing device while the computing device accesses or executes a videoconferencing application during a videoconference, the at least a portion of the screen capture of the application window comprising a set of digital images being presented in the videoconference;

executing an optical character recognition (OCR) process on the at least a portion of the screen capture of the application window to identify one or more natural language text characters included within the set of digital images;

accessing a knowledge store to identify a set of stored information associated with one or more text characters of the identified one or more natural language text characters, wherein accessing the knowledge store to identify the set of stored information is performed in response to the identifying of the one or more natural language text characters by the OCR process and without any requirement of a user request for information associated with the one or more text characters;

programmatically transmitting to the computing device, in response to the identifying of the set of stored information associated with the one or more text characters, instructions for displaying one or more components that can overlay the videoconferencing application executing on the computing device, the one or more components being formatted to emphasize the one or more text characters as an indication that an association has been identified between the one or more text characters and the set of information; and programmatically instructing the computing device to redisplay the application window along with the one or more components overlaying the videoconferencing application, such that the one or more text characters are displayed as emphasized within the set of digital images as the indication that an association has been identified between the one or more text characters and the set of information.

17. The computer system of claim 16, wherein the one or more components for overlaying the videoconferencing application comprises one or more transparent application windows.

18. The computer system of claim 16, wherein receiving the at least a portion of the screen capture of the application window comprises utilizing one or more application programming interfaces (APIs) to access a set of frames corresponding to the application window displayed on the computing device.

19. The computer system of claim 15, wherein executing the OCR process on the at least a portion of the screen capture of the application window further comprises identifying a first set of pixel coordinates corresponding to a first region of pixels, the first region of pixels corresponding to the identified one or more text characters.

20. The computer system of claim 19, wherein executing the OCR process on the at least a portion of the screen capture of the application window further comprises identifying a second set of pixel coordinates corresponding to a second region of pixels, the second region of pixels corresponding to the one or more text characters, and wherein the second region of pixels comprises a subset of the first region of pixels.

21. The computer system of claim 16, wherein providing the instructions for displaying the one or more components further comprises providing, to the computing device, instructions for displaying a highlight or a bounding geometry over the one or more text characters.

* * * * *